United States Patent
Suchak

(10) Patent No.: US 9,383,102 B2
(45) Date of Patent: Jul. 5, 2016

(54) METHODS FOR TREATING WASTE GAS STREAMS FROM INCINERATION PROCESSES

(71) Applicant: Naresh J. Suchak, Glen Rock, NJ (US)

(72) Inventor: Naresh J. Suchak, Glen Rock, NJ (US)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 14/496,009

(22) Filed: Sep. 25, 2014

(65) Prior Publication Data

US 2015/0267917 A1    Sep. 24, 2015

Related U.S. Application Data

(60) Provisional application No. 61/882,280, filed on Sep. 25, 2013.

(51) Int. Cl.
*F23J 15/02* (2006.01)
*B01D 53/56* (2006.01)
*B01D 53/76* (2006.01)

(52) U.S. Cl.
CPC .......... *F23J 15/02* (2013.01); *B01D 53/56* (2013.01); *B01D 53/76* (2013.01); *B01D 2251/104* (2013.01); *B01D 2257/402* (2013.01); *B01D 2257/404* (2013.01); *B01D 2258/0291* (2013.01); *B01D 2259/122* (2013.01); *F23J 2215/101* (2013.01); *F23J 2219/10* (2013.01); *F23J 2219/80* (2013.01); *Y02C 20/10* (2013.01)

(58) Field of Classification Search
CPC ........ B01D 53/34; B01D 53/56; A61L 2/202; A61L 2/22; F23G 7/06; F23G 2200/00
See application file for complete search history.

(56) References Cited

U.S. PATENT DOCUMENTS

| | | | |
|---|---|---|---|
| 4,011,298 A * | 3/1977 | Fukui | B01D 53/34 423/235 |
| 5,206,002 A | 4/1993 | Skelley et al. | |
| 5,985,223 A | 11/1999 | Saxena et al. | |
| 6,162,409 A | 12/2000 | Skelley et al. | |
| 6,649,132 B1 | 11/2003 | Hwang et al. | |
| 7,303,735 B2 | 12/2007 | Suchak et al. | |
| 7,371,357 B2 * | 5/2008 | Magumbe | B01D 53/229 423/210 |
| 7,534,400 B2 * | 5/2009 | Hsieh | B01D 53/56 422/168 |
| 9,115,893 B2 * | 8/2015 | Betlem | B01D 53/346 |
| 2003/0013053 A1 * | 1/2003 | Dutescu | F23G 5/14 431/5 |
| 2005/0084436 A1 * | 4/2005 | Suchak | B01D 53/50 423/242.1 |

FOREIGN PATENT DOCUMENTS

CA    2431460 C *    5/2011    ........... B01D 53/34

* cited by examiner

*Primary Examiner* — Timothy Vanoy
(74) *Attorney, Agent, or Firm* — Philip H. Von Neida

(57) ABSTRACT

A method for removing contaminants from the combustion gases generated by the incineration of waste. Air is injected into an incineration device along with a fuel and is supplemented by a oxygen feed. The resulting combustion waste gas stream contains contaminants such as nitrogen oxides and is quenched, then fed to a reaction zone where it will contact ozone for a predetermined period of time. The thus treated combustion waste gas stream can be fed to a scrubber assembly where the reaction products formed by the reaction of ozone and the contaminants are removed.

24 Claims, 3 Drawing Sheets

METHODS FOR TREATING WASTE GAS STREAMS FROM INCINERATION PROCESSES

CROSS REFERENCE TO RELATED APPLICATIONS

This application claims priority from U.S. provisional application Ser. No. 61/882,280 filed Sep. 25, 2013.

BACKGROUND OF THE INVENTION

The invention relates to the incineration of waste and the removal of contaminants such as nitrogen oxides, sulfur oxides, particulates, acid gas, heavy metals and organic toxins that result from the incineration.

The invention advantageously combines enriching the aft used in combustion with gaseous oxygen in the incineration process while using ozone to oxidize contaminants found in the combustion waste gas stream.

Oxygen enrichment can improve both the thermal destruction of waste as well as increase throughput. However, oxygen enrichment is well known to increase nitrogen oxides formation in combustion processes. Environmental permits generally restrict an incineration facility from increasing throughput when it results in higher emissions. Ozone injection into an Air Pollution Control (APC) system for treating incineration exhaust enables effective nitrogen oxides removal along with other contaminants. The chemistry of nitrogen oxides oxidation with ozone is described in a number of patents such as U.S. Pat. Nos. 5,206,002; 5,985,223; 6,162,409; 6,649,132; and 7,303,735.

The incineration of chemical and hazardous waste is of increasing interest when alternative methods to treat wastes are prohibitively costly or no longer permitted. International treaties and United States environmental regulations have limited alternatives such as the dumping of waste or ineffective treatments before emitting to the atmosphere. Process industries that desire to reach peak production often undertake optimization and intensification exercises to maximize production and profits with relatively low marginal investment in capital.

These exercises will often result in an increase in the quantity of waste generated which may be beyond the capability of the already installed incineration system to handle. A new incineration system can be expensive and generally will attract stricter environmental scrutiny. Notwithstanding the need for incineration equipment, the control of contaminants, particularly nitrogen oxides in gas streams has always been challenging.

State of the art control of nitrogen oxides emissions in incineration is generally achieved by combustion modifications. There are typically two techniques used; low nitrogen oxides burners and combustion staging. Low nitrogen oxides burners lower the flame temperature thereby forming less nitrogen oxides. In combustion staging, in the primary stage the initial combustion is carried out with limited air present, thereby forming a fuel rich environment. This ensures the formation of a reducing zone immediately downstream of the primary combustion zone where nitrogen oxides are reduced by a high level of carbon monoxide being present in the combustion products. In the second stage of the process, secondary air is introduced to complete the oxidation of combustion products including the carbon monoxide with or without the addition of supplemental fuel. Ammonia may be injected to lower nitrogen oxides by the SNCR (selective non catalytic reduction) method. A higher end method for controlling nitrogen oxides for combusting processes is SCR (selective catalytic reduction). This is not a preferred method for treating incineration exhaust due to a variety of reasons including expensive capital costs and energy intensive configurations required to offer sustainable performance.

The practice of enriching air with gaseous oxygen for improving combustion processes in glass and metal furnaces is well known. Using oxygen enrichment in incineration is fairly uncommon. Oxygen enrichment can improve both the thermal destruction of waste as well as increase throughput. Oxygen enrichment, however, is well known to increase nitrogen oxides formation in combustion processes. Environmental permits generally restrict an incineration facility from increasing throughput when it results in higher emissions. Air pollution control systems fitted on incinerators can generally handle a higher load of other air pollutants such as sulfur oxides, particulates, acid gases such as HCl, HF, $Cl_2$, heavy metals and organic toxins such as dioxins, furans and PCBs, without sacrificing performance while nitrogen oxides control remains difficult.

Incineration processes are under increased scrutiny due to concern about public health and the environment and will require superior flue gas cleanup before emission into the atmosphere particularly when throughput is enhanced.

The invention combines oxygen enrichment with ozone based control of contaminants. This process will allow for a higher throughput of waste gas streams emanating from the incineration unit while also lowering the emission of contaminants to the atmosphere. The oxygen requirement is a small increment of what is required for oxygen enrichment and can be delivered from the same oxygen supply system as that which supplies the ozone generator. By increasing throughput in the same equipment, the unit cost of waste processed can be lowered even with the supplemental cost of nitrogen oxides control.

The oxygen enrichment and ozone based nitrogen oxides removal offers the ability to debottleneck the incineration process at minimal capital investment; with the least interruption to production activity; involves minimal changes in processing equipment; provides robust and superior nitrogen oxides removal while reducing the unit cost of the waste disposed of.

SUMMARY OF THE INVENTION

In a first embodiment of the invention, there is disclosed a method for removing contaminants from a gas stream exiting an incineration device comprising the steps:

a) Feeding waste, fuel and an air supply to a combustion chamber in the incineration device;

b) Feeding oxygen to a mixture of the waste, fuel and air supply;

c) Combusting the mixture thereby forming a combustion waste gas stream containing contaminants;

d) Feeding the combustion waste gas stream to a quench unit; whereby the combustion waste gas stream is reduced in temperature;

e) Feeding the combustion waste gas stream to a reaction zone;

f) Feeding ozone to the reaction zone whereby the ozone and combustion waste gas stream remain in contact for a predetermined period of time; and g) Feeding the combustion waste gas stream to a scrubber, wherein the contaminants are removed.

In another embodiment of the invention, there is disclosed a method for removing contaminants from a gas stream exiting an incineration device comprising the steps:

a) Feeding waste to a combustion chamber of an incineration device;
b) Injecting air for supporting combustion into the incineration device;
c) Supplying gaseous oxygen to the incineration device;
d) Incinerating the waste thereby forming a combustion waste gas stream containing contaminants;
e) Feeding the combustion waste gas stream to a quench unit; whereby the combustion waste gas stream is reduced in temperature;
f) Feeding the combustion waste gas stream to a reaction zone;
g) Feeding ozone to the reaction zone whereby the ozone and combustion waste gas stream remain in contact for a predetermined period of time; and
h) Feeding the combustion waste gas stream to a scrubber, wherein the contaminants are removed.

In alternative embodiments of the invention, with respect to the first embodiment, steps f) and g) can be reversed and the combustion waste gas stream is scrubbed before it is contacted with the ozone in a reaction zone. The resultant combustion waste gas stream is then fed to a device selected from the group consisting of an electrostatic precipitator and a bag house. In the alternative embodiment, steps g) and h) would be reverse whereby the combustion waste gas stream is scrubbed before contacting the ozone in the reaction zone.

The waste that is incinerated is typically industrial waste, chemical waste and hazardous waste.

The fuel that is employed in the incineration is typically coal or oil.

The contaminants are primarily nitrogen oxides but can also include sulfur oxides, mercury and acid gases.

The nitrogen oxides are selected from the group consisting of thermal, prompt and fuel type nitrogen oxides.

The oxygen that is fed to the incineration unit is typically pure oxygen. The oxygen will be fed in an amount in excess of the stoichiometry necessary to maintain combustion in the incineration unit.

Once the waste has been combusted the combustion waste gas stream containing the contaminants leaves the incineration unit and can optionally be fed first to a waste heat boiler.

A portion of the oxygen that is generated is fed to an ozone generation unit thereby producing a mixture of ozone and oxygen. The ozone when it contacts the contaminants notably nitrogen oxides in the reaction zone will form higher oxides of nitrogen oxides The amount of ozone added to the combustion waste gas stream is controlled by measuring the amount of nitrogen oxides and ozone present in the combustion waste gas stream.

The oxygen that is fed to the incineration unit can be fed by injecting into the air that is being added along with the fuel and waste to be combusted. Alternatively, the oxygen can be fed directly into the incineration unit by injection.

A pressure swing adsorption (PSA) system may be employed to separate the ozone from the oxygen and ozone stream mixture that emanates from the ozone generation unit. The separated ozone can be fed to the reaction zone points for oxidizing the nitrogen oxides present in the waste stream from the incineration unit. The oxygen that is separated from the combined stream can be recycled back to the incineration unit for oxygen enrichment therein.

DETAILED DESCRIPTION OF THE INVENTION

Figure 1:
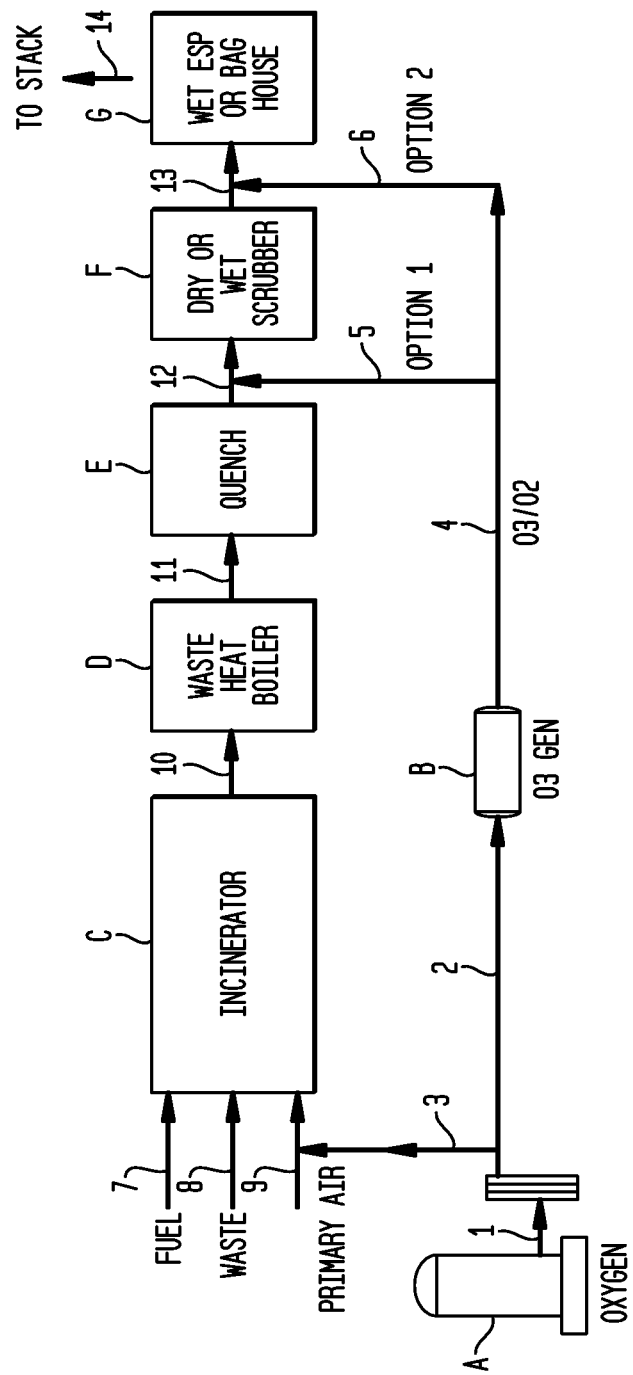
FIG. 1 is a schematic of a nitrogen oxides removal system in a waste incineration system.

FIG. 1 is a schematic of an incineration system with nitrogen oxides control. Waste containing contaminants is fed to an incinerator C combustion zone along with fuel and air through ones 7 and 9 respectively to the burners in the incinerator. The primary air 9 is enriched with oxygen from an oxygen source A through line 3 and fed to the incinerator C where it will improve combustion. Oxygen that is contained in the enriched air is maintained in excess of the stoichiometric requirement to completely burn the fuel and the combustibles in the waste.

Nitrogen oxides formed during combustion are thermal, prompt and fuel nitrogen oxides. Thermal nitrogen oxides are nitrogen oxides formed through high temperature oxidation of the diatomic nitrogen found in combustion air. Prompt nitrogen oxides are the source of nitrogen oxides attributed to the reaction of atmospheric nitrogen with radicals such as C, CH, and $CH_2$ fragments derived from fuel, where this cannot be explained by either the thermal or fuel processes. Fuel nitrogen oxides are the major source of nitrogen oxides produced from nitrogen-bearing fuels such as certain coals and oil by the conversion of fuel bound nitrogen to nitrogen oxides during combustion.

During combustion, the nitrogen bound in the fuel is released as a free radical and ultimately forms free nitrogen or NO. Nitrogenous compounds in the waste stream 8 also form additional nitrogen oxides during combustion. For the desired thermal destruction of waste, the combustion products containing gas stream is maintained at the required temperature for a predetermined period of time in the incinerator furnace C. In order to increase throughput of the waste in the incinerator C, some of the primary air in line 9 is replaced with oxygen from line 3, keeping the total volume of the gas within design flow. Oxygen enrichment will often result in an increase in flame temperature. The higher flame temperature due to oxygen enrichment will improve waste destruction efficiency but will cause an increase in thermal nitrogen oxides formation. A slip stream of oxygen 2 from the combustion enrichment supply of oxygen A is diverted to an ozone generator B where oxygen is converted to up to 10 weight percent ozone in oxygen. The ozone generator will typically be a corona discharge device for forming ozone.

The combustion waste gas stream exiting the incinerator C containing the combustion products is fed optionally to a waste heat boiler D through line 10 to recover heat and is then fed through line 11 to a quench unit E where it will be quenched with an aqueous solution. The cooling and quenching is carried out to minimize the formation of further contaminants such as PCBs, dioxins and furans.

There are two options for integrating the nitrogen oxides removal with the waste incineration. In option 1, ozone is injected through line 5 into the quenched gas stream 12 upstream of a dry or wet scrubber F. Upon mixing with the ozone and maintaining for a proper retention time, in the reaction zone nitrogen oxides are oxidized to higher oxides, preferably the pentavalent form, $N_2O_5$. The pentavalent form of nitrogen oxide is quite soluble in aqueous solutions. The quenched stream is saturated with water vapor and will convert the oxidized nitrogen oxides into stable oxyacids such as nitric acid which will mix with water in all proportions and be captured in a wet scrubbing operation F. Nitric acid and the oxidized nitrogen oxides are also very reactive and almost entirely retained by commonly used adsorbents in the dry scrubber.

In option 2, nitrogen oxides are oxidized downstream of the wet or dry scrubber F. The ozone that is produced in the ozone generator B is fed through line 4 to a reaction zone 13 between the wet or dry scrubber F and the wet electrostatic precipitator or bag house G. This option allows for segregating nitrogen oxides removal from the removal of other pollutants in the dry or wet scrubber F. The oxidized scrubber components are captured in the wet electrostatic precipitator G downstream of the wet scrubber F or in a bag house G which for purposes of illustration is alternatively located downstream of the wet or dry scrubber F. The thus treated combustion waste gas stream free of contaminants is discharged to the atmosphere through line 14.

The oxygen stream flowing from the oxygen supply A is typically in amounts ranging from one fourth to one fiftieth the amount of oxygen used in enrichment. The ozone is mixed into the gas stream which is at a temperature of about 25° F. (−4° C.) to 325° F. (163° C.). The ozone is produced in the ozone generator B in an amount up to 10 weight percent ozone to oxygen. Typically, the ozone to nitrogen oxide mole ratio is maintained between 0.5 and 1.5 for nitrogen oxides removal.

Figure 2:
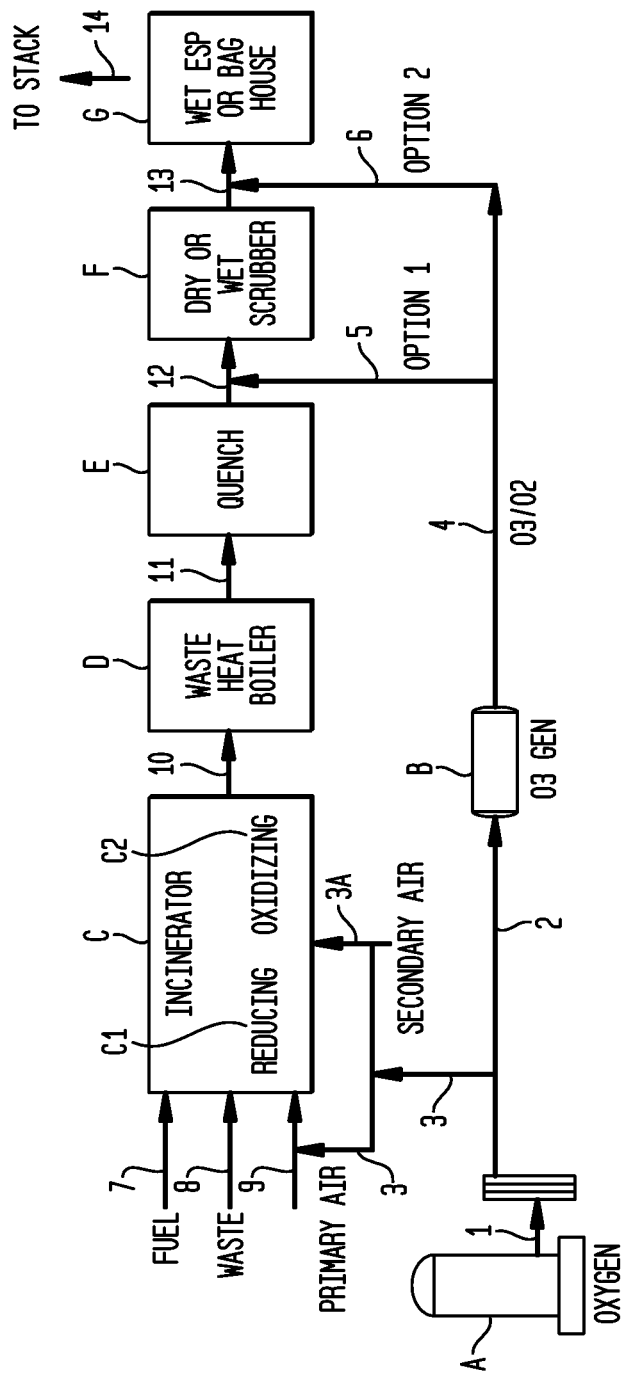
FIG. 2 is a schematic of a nitrogen oxides removal system in a waste incineration system with an incinerator having two zones after combustion.

FIG. 2 depicts a different embodiment of the invention. Like components, lines and unit operations are given the same number and letter designations as those given for FIG. 1. The incinerator unit C has two zones after combustion, namely a reducing zone C1 and an oxidizing zone C2. The oxygen contained in the enriched air is maintained near the stoichiometric requirement to burn the fuel and the combustibles in the gas stream. By not maintaining an excess of oxygen during combustion, significant amounts of carbon monoxide will be formed in the combustion product stream. The nitrogen oxides formed are thermal, prompt and fuel nitrogen oxides. Nitrogenous compounds in the waste stream also form additional nitrogen oxides during combustion. Due to oxygen enrichment, the amount of thermal nitrogen oxides sharply rises.

Downstream of combustion, but still within the incinerator unit C the gases are retained for a predetermined time in a reducing zone C1. The high concentration of carbon monoxide present in the combustion product due to the lack of excess oxygen reduces an appreciable amount of nitrogen oxides to nitrogen. The reducing zone C1 is followed by an oxidizing zone C2 where supplementary or secondary air from line 3A which can be optionally enriched with oxygen 3 from the oxygen source A is mixed with or without supplemental fuel. The excess oxygen enables rapid conversion of carbon monoxide to carbon dioxide. The low nitrogen oxides burner and combustion staging lowers nitrogen oxides formation which in turn will require even smaller doses of ozone. As such, some of the nitrogen oxides formed is reduced in the incinerator unit C itself thereby alleviating the ozone requirement for nitrogen oxides removal in the downstream equipment as depicted in FIG. 1.

The combustion waste gas stream exiting the incinerator containing the combustion products and contaminants is routed to an optional waste heat boiler D through line 10 to recover heat and then quenched with an aqueous solution after being fed through line 11 to a quench unit E. The cooling and quenching will be carried out fairly rapidly to minimize the formation of air toxins or contaminants such as PCBs, dioxins and furans.

There are two options available for treating nitrogen oxides and integrating their removal into an incinerator unit C. The first option, option 1, is to inject ozone from the ozone generator upstream of a dry or a wet scrubber F in a reaction zone 12 and allow it to thoroughly mix with the quenched gas stream being fed from the quench unit E. The nitrogen oxides present in the quenched combustion waste gas stream will be oxidized by the ozone to higher oxides of nitrogen, preferably to the pentavalent form ($N_2O_5$). The operator can control the retention time for example in the reaction zone 12 to allow for enough time for the reactions to occur. The pentavalent form of nitrogen oxides is extremely soluble in water. The quenched combustion waste gas stream is saturated with water vapor and will convert the oxidized nitrogen oxides into stable oxyacids such as nitric acid which mixes with water in all proportions and is captured in wet scrubbing operations. Nitric acid and oxidized nitrogen oxides are also very reactive can be retained by commonly used adsorbents in dry scrubbing operations.

In the second option, option 2, the quenched gas stream is fed to the dry or web scrubber F where other contaminants that are present in the quenched gas stream are removed before the nitrogen oxides are. The gas stream that leaves the dry or the wet scrubber will not be free of contaminants such as particulates, sulfur oxides, mercury and other contaminants will be fed to a reaction zone 13 that is situated before a wet electrostatic precipitator or alternatively a baghouse G. The ozone from the ozone generator will be fed to this reaction zone where it will contact the gas stream from the dry or wet scrubber F and be retained there for a sufficient amount of time for the ozone to oxidize the nitrogen oxides to the higher oxides of nitrogen and nitric acid as may be present in the gas stream. The gas stream containing the higher oxides of nitrogen and nitric acid will be fed wet electrostatic precipitator or alternatively a bag house G. The wet electrostatic precipitator (ESP or WESP) G will remove any particulates and other contaminants such as the higher oxides of nitrogen and nitric acid present in the gas stream. The baghouse G will also remove these contaminants. The thus treated combustion waste gas stream free of contaminants is discharged to the atmosphere through line 14.

The oxygen stream 3 flowing from the oxygen supply unit A is typically in amounts ranging from one fourth to one fiftieth the amount of oxygen used in enrichment. The ozone is mixed into the gas stream which is at a temperature of about 25° F. (−4° C.) to 325° F. (163° C.). The ozone is produced in the ozone generator B in an amount up to 10 weight percent ozone to oxygen. Typically, the ozone to nitrogen oxide mole ratio is maintained between 0.5 and 1.5 for nitrogen oxides removal.

In certain circumstances, the waste being fed to the incinerator unit C will have a higher water content and less combustible material content. These situations will substantially reduce throughput as the capacity or volume of liquid waste that can be handled will diminish due to the increases in fuel required. Oxygen enrichment integrated with ozone based nitrogen oxides removal will operate to provide normal throughput while addressing the concerns of the contaminants present in the gas stream leaving the incinerator.

Figure 3:
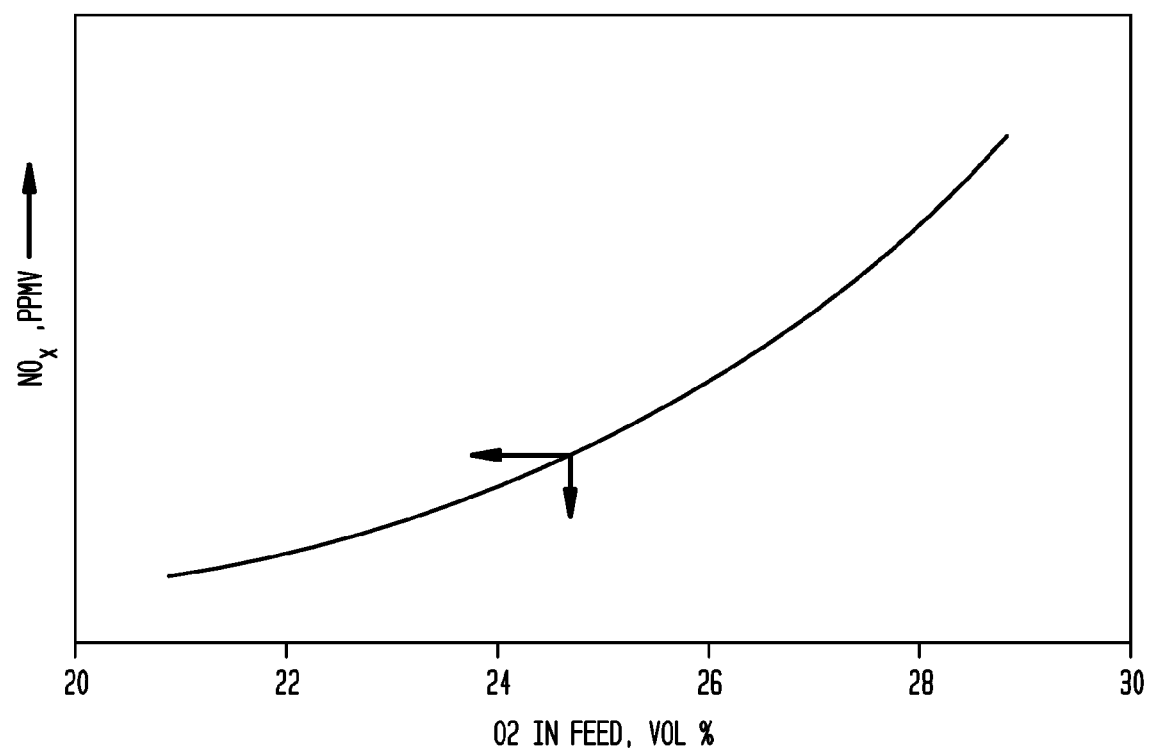
FIG. 3 is a graph depicting nitrogen oxides concentration of the gas stream exiting the incinerator versus the amount of oxygen enrichment.

FIG. 3 is a graph depicting the rise in nitrogen oxides concentration of a gas stream leaving the incinerator versus the amount of oxygen enrichment in the feed gas being fed to the incinerator.

While this invention has been described with respect to particular embodiments thereof, it is apparent that numerous other forms and modifications of the invention will be obvious to those skilled in the art. The appended claims in this

Having thus described the invention, what I claim is:

1. A method for removing contaminants from a gas stream exiting an incineration device comprising the steps:
    a) Feeding waste, fuel and an air supply to a combustion chamber in the incineration device;
    b) Feeding oxygen to a mixture of the waste, fuel and air supply;
    c) Combusting the mixture thereby forming a combustion waste gas stream containing contaminants;
    d) Feeding the combustion waste gas stream to a quench unit; whereby the combustion waste gas stream is reduced in temperature and the formation of additional contaminants is reduced;
    e) Feeding the combustion waste gas stream to a reaction zone;
    f) Feeding ozone to the reaction zone whereby the ozone and combustion waste gas stream remain in contact for a predetermined period of time; and
    g) Feeding the combustion waste gas stream to a scrubber, wherein the contaminants are removed.

2. The method as claimed in claim 1 wherein steps f) and g) are reversed and the combustion waste gas stream is fed to a device selected from the group consisting of an electrostatic precipitator and a bag house.

3. The method as claimed in claim 1 wherein the waste is selected from the group of chemical and hazardous waste.

4. The method as claimed in claim 1 wherein the fuel is selected from the group consisting of coal and oil.

5. The method as claimed in claim 1 wherein the contaminants are nitrogen oxides.

6. The method as claimed in claim 5 wherein the nitrogen oxides are selected from the group consisting of thermal, prompt and fuel.

7. The method as claimed in claim 1 wherein the oxygen is fed to the mixture in an amount in excess of stoichiometry for combustion.

8. The method as claimed in claim 1 further comprising feeding the combustion waste gas stream to a waste heat boiler.

9. The method as claimed in claim 1 where a portion of the oxygen is fed to an ozone generator thereby generating ozone.

10. The method as claimed in claim 1 wherein the ozone will react with nitrogen oxides thereby forming higher oxides.

11. The method as claimed in claim 1 wherein the amount of ozone added to the combustion waste gas stream is controlled by measuring the amount of nitrogen oxides and ozone present in the combustion waste gas stream.

12. A method for removing contaminants from a gas stream exiting an incineration device comprising the steps:
    a) Feeding waste to a combustion chamber of an incineration device;
    b) Injecting air for supporting combustion into the incineration device;
    c) Supplying gaseous oxygen to the incineration device;
    d) Incinerating the waste thereby forming a combustion waste gas stream containing contaminants;
    e) Feeding the combustion waste gas stream to a quench unit; whereby the combustion waste gas stream is reduced in temperature and the formation of additional contaminants is reduced;
    f) Feeding the combustion waste gas stream to a reaction zone;
    g) Feeding ozone to the reaction zone whereby the ozone and combustion waste gas stream remain in contact for a predetermined period of time; and
    h) Feeding the combustion waste gas stream to a scrubber, wherein the contaminants are removed.

13. The method as claimed in claim 12 wherein the oxygen is fed to the incineration device by injecting into the air.

14. The method as claimed in claim 12 wherein the oxygen is fed to the incineration device by injecting into the incineration unit.

15. The method as claimed in claim 12 wherein steps f) and g) are reversed and the combustion waste gas stream is fed to a device selected from the group consisting of an electrostatic precipitator and a bag house.

16. The method as claimed in claim 12 wherein the waste is selected from the group of chemical and hazardous waste.

17. The method as claimed in claim 12 wherein the fuel is selected from the group consisting of coal and oil.

18. The method as claimed in claim 12 wherein the contaminants are nitrogen oxides.

19. The method as claimed in claim 18 wherein the nitrogen oxides are selected from the group consisting of thermal, prompt and fuel.

20. The method as claimed in claim 12 wherein the oxygen is fed to the mixture in an amount in excess of stoichiometry for combustion.

21. The method as claimed in claim 12 further comprising feeding the combustion waste gas stream to a waste heat boiler.

22. The method as claimed in claim 12 where a portion of the oxygen is fed to an ozone generator thereby generating ozone.

23. The method as claimed in claim 12 wherein the ozone will react with nitrogen oxides thereby forming higher oxides.

24. The method as claimed in claim 12 wherein the amount of ozone added to the combustion waste gas stream is controlled by measuring the amount of nitrogen oxides and ozone present in the combustion waste gas stream.

* * * * *